United States Patent
Das et al.

(10) Patent No.: US 8,327,556 B2
(45) Date of Patent: Dec. 11, 2012

(54) HYDRAULIC MICROMETER SYSTEM FOR REMOTE MEASUREMENT OF INSIDE DIAMETER OF PIPES

(75) Inventors: Nirupam Das, Trombay (IN); Bhimjibhai Bhavanbhai Rupani, Trombay (IN)

(73) Assignee: The Secretary, Department of Atomic Energy, Govt. of India, Mumbai (IN)

( * ) Notice: Subject to any disclaimer, the term of this patent is extended or adjusted under 35 U.S.C. 154(b) by 444 days.

(21) Appl. No.: 12/668,107

(22) PCT Filed: Apr. 11, 2008

(86) PCT No.: PCT/IN2008/000242
§ 371 (c)(1),
(2), (4) Date: Jan. 7, 2010

(87) PCT Pub. No.: WO2009/125419
PCT Pub. Date: Oct. 15, 2009

(65) Prior Publication Data
US 2010/0186247 A1    Jul. 29, 2010

(51) Int. Cl.
*G01B 5/12* (2006.01)
*G01B 13/10* (2006.01)
(52) U.S. Cl. .................................................. 33/543.1
(58) Field of Classification Search ............... 33/543.1
See application file for complete search history.

(56) References Cited

U.S. PATENT DOCUMENTS

| | | | |
|---|---|---|---|
| 1,547,668 A | | 7/1925 | Poltin |
| 2,348,643 A | | 5/1944 | Poole |
| 2,369,319 A | * | 2/1945 | Smith ......................... 33/543.1 |
| 2,660,800 A | * | 12/1953 | Wiley ......................... 33/543.1 |
| 2,706,339 A | * | 4/1955 | Aller ........................... 33/543.1 |
| 2,795,855 A | * | 6/1957 | Worthen ..................... 33/543.1 |
| 3,918,164 A | * | 11/1975 | Krautmann ..................... 33/511 |
| 4,307,514 A | * | 12/1981 | Ange et al. ................... 33/543.1 |
| 4,477,977 A | * | 10/1984 | Lusignea et al. ............. 33/543.1 |
| 4,673,890 A | * | 6/1987 | Copland et al. ............. 33/544.2 |
| 6,243,962 B1 | * | 6/2001 | Brock ............................. 33/542 |
| 7,409,774 B2 | * | 8/2008 | Luling ........................ 33/544.2 |

FOREIGN PATENT DOCUMENTS

| | | |
|---|---|---|
| DE | 3930794 A1 * | 3/1991 |
| GB | 509718 | 7/1939 |
| GB | 2107046 | 4/1983 |

OTHER PUBLICATIONS

International Search Report dated Jun. 5, 2009 issued for PCT/IN2008/000242.

\* cited by examiner

*Primary Examiner* — Christopher Fulton
(74) *Attorney, Agent, or Firm* — The Law Office of Michael E. Kondoudis

(57) ABSTRACT

A hydraulic micrometer system for remote measurement of inside dimensions such as the inside diameter of long straight/curved pipes and tubes adapted to go deep inside any long straight/curved pipe/tube by way of provision of flexible operative connection there between the micrometer head adapted for traversal deep inside the pipe/tube and the like and a remotely located control unit. Importantly, the micrometer system preferably includes a three-point micrometer for measurement of dimensions of internal diameter and the like or a two point micrometer for measurement of depth of a slot or groove and the like features. Advantageously, the hydraulic micrometer system have applications in manufacturing industries, process industries, power plants, chemical plants etc., including in hazardous and humanly inaccessible positions. The system is user friendly including PC-based control, display and data analysis provision for wide industrial application and use.

9 Claims, 5 Drawing Sheets

Figure 1:
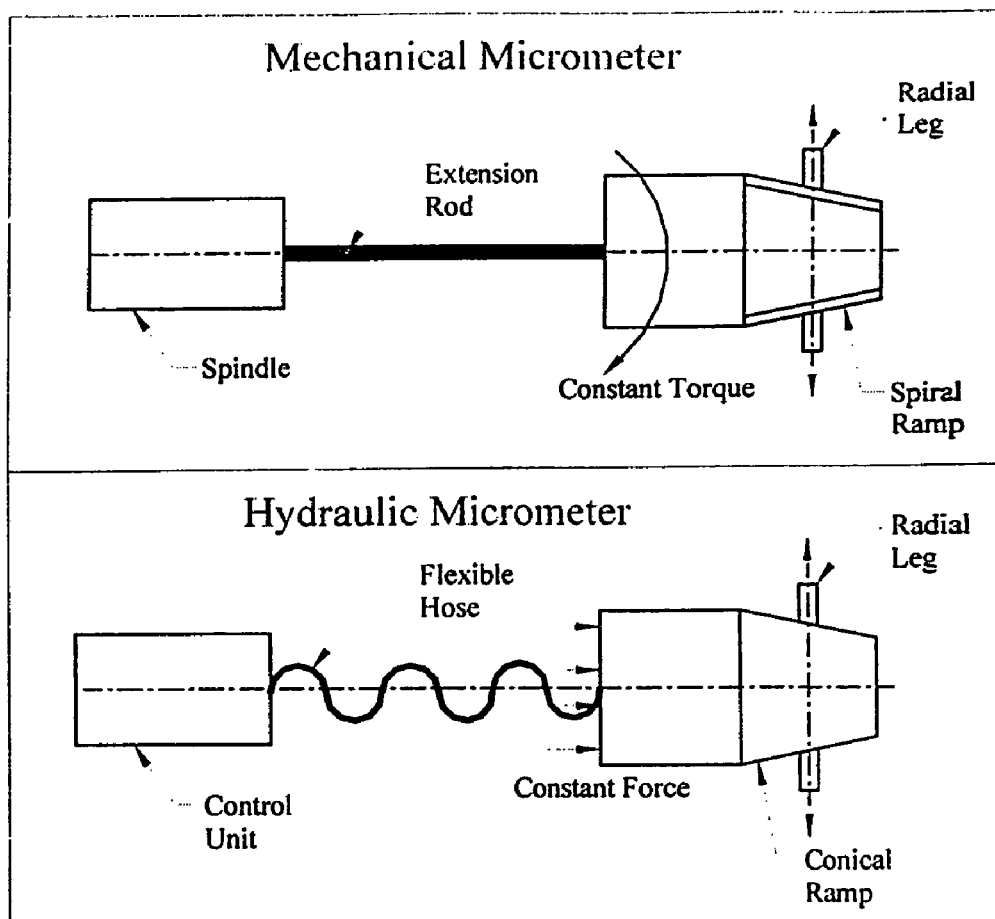

(a) Hydraulic micrometer head (b) Control unit

US 8,327,556 B2

HYDRAULIC MICROMETER SYSTEM FOR REMOTE MEASUREMENT OF INSIDE DIAMETER OF PIPES

FIELD OF THE INVENTION

The present invention relates to a hydraulic micrometer and in particular to a hydraulic micrometer system for remote measurement of inside dimensions such as the inside diameter of long straight/curved pipes and tubes. Advantageously, the micrometer system of the invention is adapted to go deep inside any long straight/curved pipe/tube by way of provision of flexible operative connection therebetween the micrometer head adapted for traversal deep inside the pipe/tube and the like and a remotely located control unit Importantly, the micrometer system of the invention is preferably adapted for selectively providing for a three-point micrometer having three radial legs for measurement of dimensions of internal diameter and the like or a two point micrometer having two legs for said internal dimension measurement of depth of a slot or groove and the like features. Moreover, the micrometer head is advantageously provided as a self-centering type hydraulically operable micrometer head which can be remotely operated making the instrument simple, robust and reliable and capable of being used in difficult to reach or hazardous to access working situations, with flexibility and ease. The hydraulically operated system of the measuring micrometer head of the invention is based on the positive fluid displacement control of the pistons of two cylinders, which are hydraulically coupled by a flexible hydraulic connector. Advantageously, therefore the hydraulic micrometer system of the present invention is advantageously applied for remote measurement of inside diameter of pipes and tubes in manufacturing industries, process industries, power plants, chemical plants etc., including in hazardous and humanly inaccessible positions. The system is further adapted to be used for shop-floor applications involving production of pipes and tubes, for under-water applications, for in service/process inspection and certification and for other similar applications. The system is user friendly including PC-based control, display and data analysis provision for wide industrial application and use.

BACKGROUND ART

In the conventional art of metrological appliances in the relevant field, the type of instrument for measurement of inside diameter is mechanical three-point inside micrometer. This instrument is used currently for direct measurement of inside diameter. The mechanical micrometer head contains three radial legs, which are pushed outward by rotary action of a spiral ramp. The spiral ramp in the micrometer head is rigidly coupled to its operating spindle either directly or through a number of extension rods. The spindle carries a feel ratchet which slips when the radial legs are in contact with inside diameter providing reading of observed diameter.

In the conventional mechanical three-point micrometer as described herein above, such an instrument is very much suitable for local inside diameter measurement, but not suitable for inside diameter measurement at remote locations where straight and direct access is not available for the whole instrument i.e., the micrometer head, extension rods and operating spindle. Moreover, since an operator needs to stand just in front of open end of a pipe/tube being measured by this mechanical micrometer, safety of the operator cannot be ensured in a hazardous working environment. Hence, the application of this instrument is not suitable for service conditions like high temperature area or in under-water application. The existing range of instruments is also not adapted for use in presence of toxic or radioactive materials, which put the operator to health hazards, posing threat of disease/disability/life upon repeated exposures, in sustained operations.

Some other types of instruments in the existing range comprises use of compressed air, ultrasonic signal etc. for indirect measurement of inside diameter. However, these instruments are quite different in operational principle and less reliable and versatile limiting their application to a narrower field. Further, such instruments are not self-centering type, thus not being able to ensure accuracy of measuring mean inside diameter at a particular location. The ultrasonic-type micrometer head contains a number of electronic components and hence, is susceptible to error due to signal drift and noise because of temperature, pressure, radiation etc at the place of measurement.

A fair number of US Patent documents have dealt with the subject of measuring inside diameter of conduits/pipes viz U.S. Pat. No. 6,895,681 titled 'Method and instrument for measuring inside diameter of conduit', U.S. Pat. No. 6,675,632 titled 'Inside diameter measuring method and apparatus, U.S. Pat. No. 5,787,596 titled 'Apparatus for simultaneously measuring thickness of bottom wall and inside diameter of bottoming hole, U.S. Pat. No. 4,216,586 titled 'Pipe inside diameter measurement gauge', U.S. Pat. No. 3,959,887 titled 'Device for precision measurement of internal diameters'. But none of the cited prior art documents involve any hydraulic system for the apparatus used for measurement of inside diameters, as of the present invention.

Also, to change easily a detection gap length and to improve the detection sensitivity, by comparing and amplifying the back pressure of a detecting nozzle and a reference pressure by a differential pressure amplifier in a hydraulic type micrometer is disclosed in JP 57153207 dated Sep. 21, 1982 titled 'Hydraulic type micrometer'. It further states that compressed air from an air source has pressure reduced by a reducing valve and is adjusted to a supply pressure. A gauge is used for this adjustment. When air of the supply pressure is jetted onto the surface of a material to be measured on a reference face from a detecting nozzle through a fixed orifice, a backpressure corresponding to a detecting gap is generated in the supply path to the nozzle. The back pressure is supplied to a comparison pressure supply port of a differential pressure amplifier. A reference pressure adjusted by an orifice and a needle valve is supplied to a comparison pressure input port of the differential pressure amplifier, and a pressure switch is operated when the gap length becomes a length corresponding to the reference pressure. Thus this prior art involves the hydraulic operation using compressed air for detecting a gap corresponding to a back pressure when compared against a reference pressure. However, as apparent from the cited disclosure the prior art does not specifically address any simple and user friendly micrometer for ready and safe measurement of inside diameter of pipes/tubes remotely especially for use in measurements involving hazardous location or humanly non-accessible locations.

There has been, therefore, a continuing need in the art for developing micrometer for measuring remotely the inside diameter of pipes/tubes through long straight/bend stretch eliminating the problems associated with inaccessibility due to complexity of measurements by conventional micrometers wherein the spiral ramp in the micrometer head is rigidly coupled to its operating spindle either directly or through a number of extension rods. Moreover, while catering to such need of remote measurement of internal dimensions of objects in hazardous or humanly in accessible locations any such measuring device is further required to ensure reliable and accurate measurement of inside diameter remotely ensuring safety of operator even when applied to operating situation like high temperature or in presence of toxic or radioactive materials. It is also important that such measuring system be simple and user friendly in construction and operation, avoiding use of sensitive/delicate electronic components/devices, so as to eliminate problems/errors as observed in conventional instruments, due to signal drift and noise associated with factors like temperature, pressure, radiation etc at the place of measurement.

OBJECTS OF THE INVENTION

It is thus the basic object of the present invention to provide a hydraulic micrometer for remote measurement of inside diameter of long straight/curved pipes and tubes with desired accuracy and reliability while maintaining operators safety even when the same is applied in toxic or hazardous working environment and a method for carrying out such measurements.

A further object of the present invention is directed to developing a micrometer system of hydraulically operated self-centering type inside diameter measuring micrometer wherein the micrometer head is adapted for desired three-point or two-point contact for measurement of inside dimension and connected to its control unit with flexible means adapted to go deep inside the long straight/curved pipe/tube, the location at which direct straight-line access is not possible by using the conventional rigidly coupled micrometer head to the control unit such as the mechanical type micrometers.

Another object of the present invention is directed to an inside diameter measuring micrometer wherein the operator need not stand in front of open end of a pipe/tube being measured, such that the operator's safety is taken care of as the operator can operate it from a remote control unit located at a convenient place, which can be applied in high temperature area or in under-water application or in presence of toxic materials and in radioactive areas.

A still further object of the present invention directed to developing an inside diameter micrometer wherein the micrometer head comprise preferably self-centering type three equally spaced radial legs moved outward by the linear action essentially performing desired remote measurement of inside diameter, when said three leg tips operatively simultaneously come in contact with inner wall of pipe/tube at the location of measurement at desired contact pressure enabling the desired remote measurement of inside diameters and the like.

A further objective is to developing an inside diameter micrometer in which the micrometer system head is free of any electronic devices and thus making its operation unaffected by signal drift, electrical noise and such other disturbances while working in presence of elevated temperature or pressure, radiation, vibration etc. at the location of measurement, ensuring long life and reliable operation.

A further object is to developing an inside diameter micrometer wherein the hydraulically operated system of the measuring micrometer head of the invention is based on the positive fluid displacement control involving a self centering type micrometer head adapted to carryout measurement of inside diameter at inaccessible location inside pipe/tube.

A still further object of the present invention is directed to adaptability of the said hydraulically operated measuring instrument into at least one dimension measuring radial arm preferably a two-point micrometer for measurement of internal dimensions like depth of a slot or groove and other similar features or a three point contact micrometer for measuring inside diameter in pipelines/tubes which are not easily accessible for measurement by standard instruments.

A still further objective of the present invention directed to a simple and cost-effective and safe method of remotely measuring the inside dimensions like depth of a slot or groove and other similar features or measuring inside diameter in pipelines/tubes which are not easily accessible for measurement by presently available instruments.

SUMMARY OF THE INVENTION

Thus according to the basic aspect of the present invention there is provided a hydraulic micrometer system adapted for remote measurement of internal dimensions such as inside diameter of long straight/curved pipes and tubes, depth of slot or groove and the like comprising:

a hydraulically operable master cylinder having a cooperative master piston installed in a control unit;

a slave cylinder having for dimension measurement with a cooperative slave piston installed in the micrometer head adapted to traverse inside for said dimension measurement and flexibly hydraulically coupled to said master cylinder such that displacement of the piston of the slave cylinder is indirectly controlled by the actuation of the piston of the master cylinder in said control unit, said slave piston being conical shaped such that said displacement of the slave piston in relation to said main piston causes said radial leg to extend outwards and finally touch the internal contact point for internal dimension measurement.

A further aspect of the present invention directed to a hydraulic micrometer system adapted for remote measurement of internal dimensions such as inside diameter of long straight/Curved pipes and tubes comprising:

a hydraulically operable master cylinder having a cooperative master piston installed in a control unit;

a slave cylinder having plurality of radially displaceable radial leg for dimension measurement with a cooperative slave piston installed in the micrometer head adapted to traverse inside for said dimension measurement and flexibly hydraulically coupled to said master cylinder such that displacement of the piston of the slave cylinder is indirectly controlled by the actuation of the piston of the master cylinder in said control unit, said slave piston being conical shaped such that said displacement of the slave piston in relation to said main piston causes said plurality of radial legs to extend outwards and finally touch the internal contact point for internal dimension measurement.

A still further preferred aspect of the present invention directed to said hydraulic micrometer system comprising selectively a three-point micrometer having three radial legs for measurement of dimensions of internal diameter and the like or a two point micrometer having two legs for said internal dimension measurement of depth of a slot or groove and the like features.

Another advantageous aspect of the present invention directed to said hydraulic micrometer system wherein said slave cylinder is flexibly hydraulically connected to said main cylinder through a long flexible hose such that the micrometer head having the slave cylinder and radial legs for internal dimension measurement can be inserted deep into the object whose internal dimensions are measured.

According to a further important aspect of the present invention directed to said hydraulic micrometer system comprising means for continuous measurement of the rate of rise of pressure of system fluid and measure the internal diameter based thereon.

A still further aspect of the present invention directed to a hydraulic micrometer wherein said micrometer head is self-centering type.

According to yet another aspect of the hydraulic micrometer system of present invention comprising:
in-built calibration means;
automated operational features including PC based control unit, display and data analysis.

A still further aspect of the present invention is directed to a hydraulic micrometer system wherein said control unit comprises:
master cylinder with master piston operatively connected to lead screw and its nut whereby the rotation of the stepper motor is adapted to rotate the lead screw nut causing forward motion of the lead screw with the master piston;
pressure transmitter;
stepper motor fitted with encoder means; and
data acquisition and control panel.

According to another aspect of the present invention directed to said hydraulic micrometer system wherein said micrometer head comprises:
slave cylinder having a cooperative slave piston and its retraction spring;
radial legs; and
bearings.

A still further aspect of the present invention directed to said hydraulic micrometer system wherein in said control unit the feedback data from the encoder and pressure transmitter are analyzed on-line at data acquisition and control panel which is utilized to generate a graphical representation of pressure vs radial leg tip-diameter, the dimension at contact point being identified by sudden rise in pressure rise rate on touching of the radial leg at said internal contact point.

Another aspect of the present invention directed to said hydraulic micrometer system wherein said bearings are adapted to facilitate the centering of the micrometer head inside the tube/pipe and the like whose internal dimensions are to be measured.

A still further aspect of the present invention directed to a method of remote measurement of internal dimensions of long straight/curved pipes and tubes, depth of slot or groove, robotic applications involving remote dimensional inspections and the like comprising:
providing the hydraulic micrometer system;
inserting the micrometer head having the slave cylinder deep inside the pipeline/groove etc whose internal dimensions are to be measured;
operating the stepper motor which rotates the lead screw nut causing forward motion of the nut screw with the master piston in the control unit whereby the displacement of the master piston causes equal displacement of the slave piston which in turn extend the radial legs and the tip diameter of the radial legs increases until it comes in contact with the inside surface of the tube/pipe;
analyzing online the feed back data from the encoder and pressure transmitter at data acquisition and control panel and generating the graph of pressure vs radial leg tip-diameter and identifying based on the sudden rise in the pressure rise rate at contact point to determine the internal dimension.

According to yet another advantageous aspect of the present invention directed to a method of remote measurement of internal dimensions wherein the bearings are used to center the micrometer head inside the tube/pipe during measurement.

The objects and advantages of the present invention are described in greater details with particular reference to the following accompanying non limiting illustrative figures and example.

BRIEF DESCRIPTION OF THE ACCOMPANYING FIGURES

Figure 2:
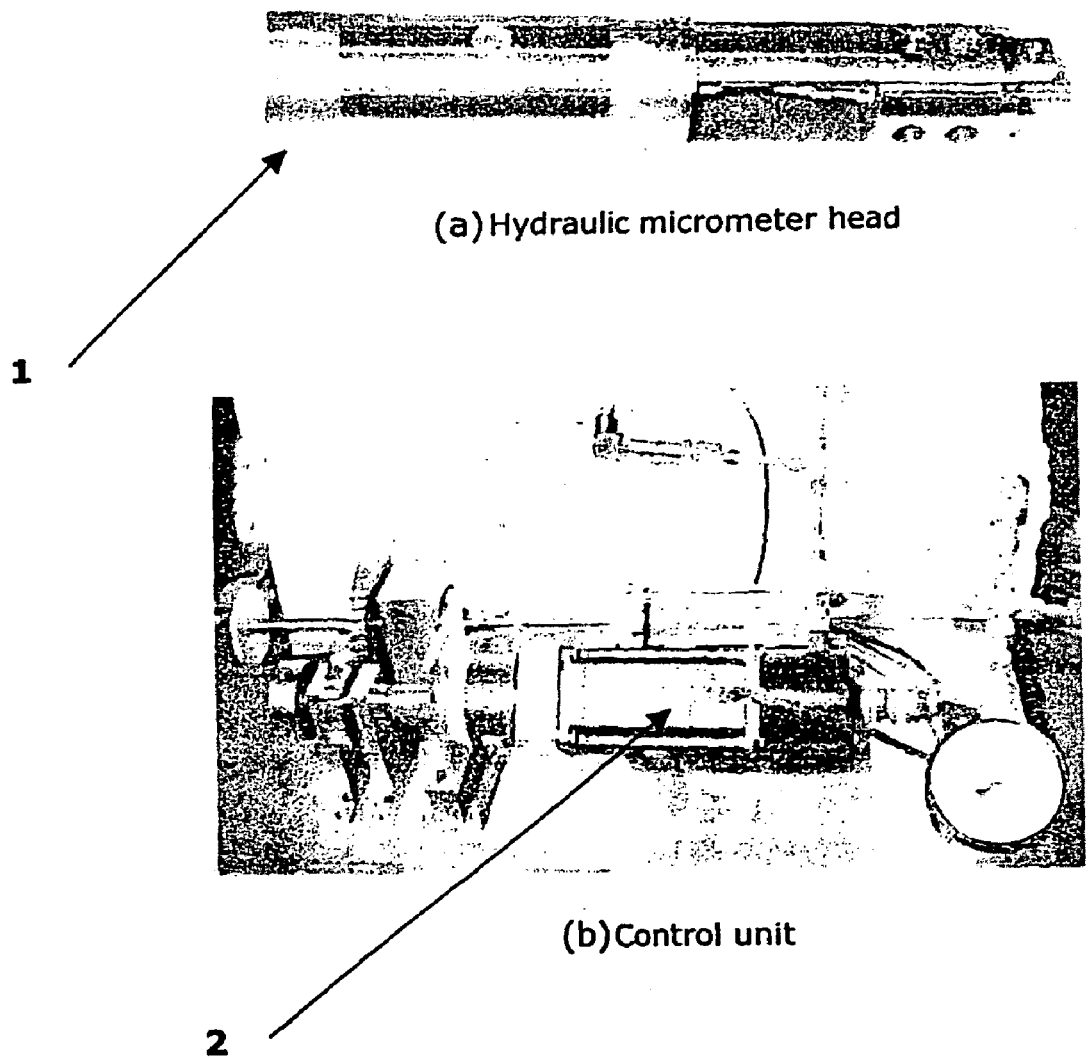

FIG. 1: is the illustration of the schematic arrangement showing the Comparison of measurement principle of conventional Mechanical micrometer versus the Hydraulic micrometer of the present invention;

FIG. 2: is the photo-graphic illustration of the Hydraulic micrometer according to the invention having (a) self centering type three point micrometer head and (b) its control unit.

Figure 3:
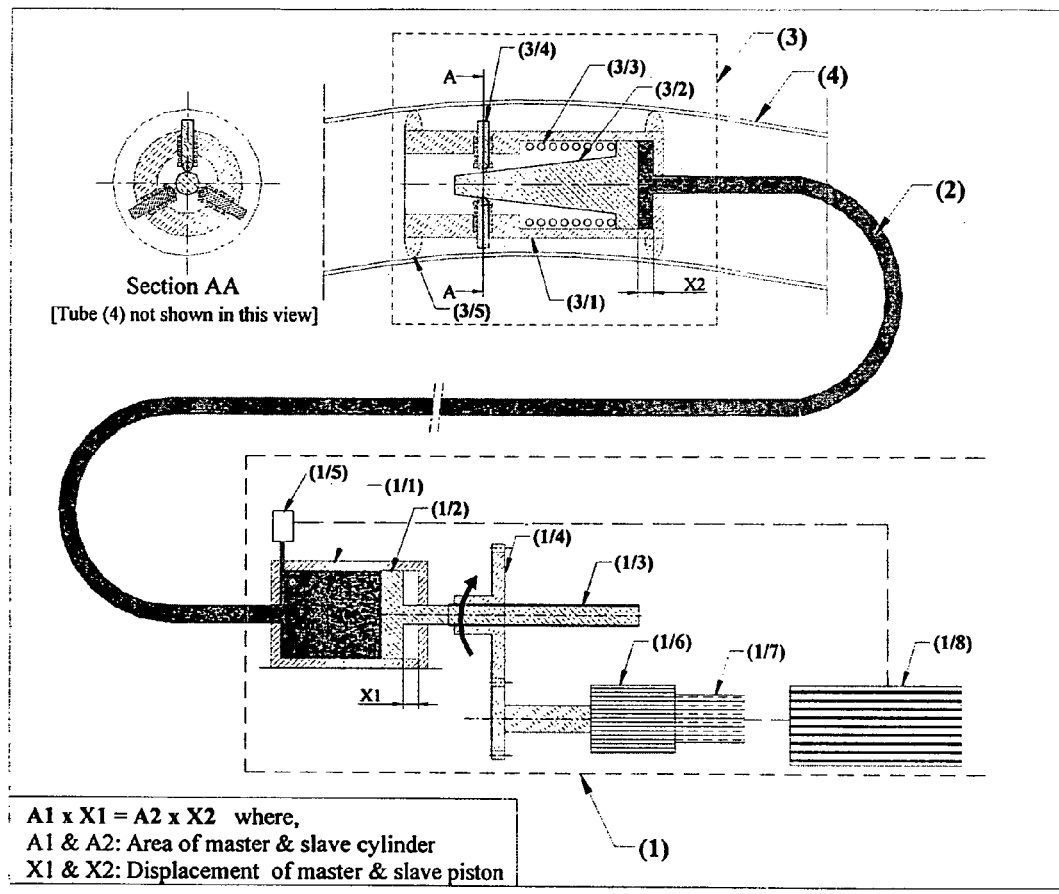

FIG. 3: is the illustration of the schematic arrangement of Hydraulically operated Micrometer with three contact self centering type micrometer head and control unit according to the present invention.

Figure 4:
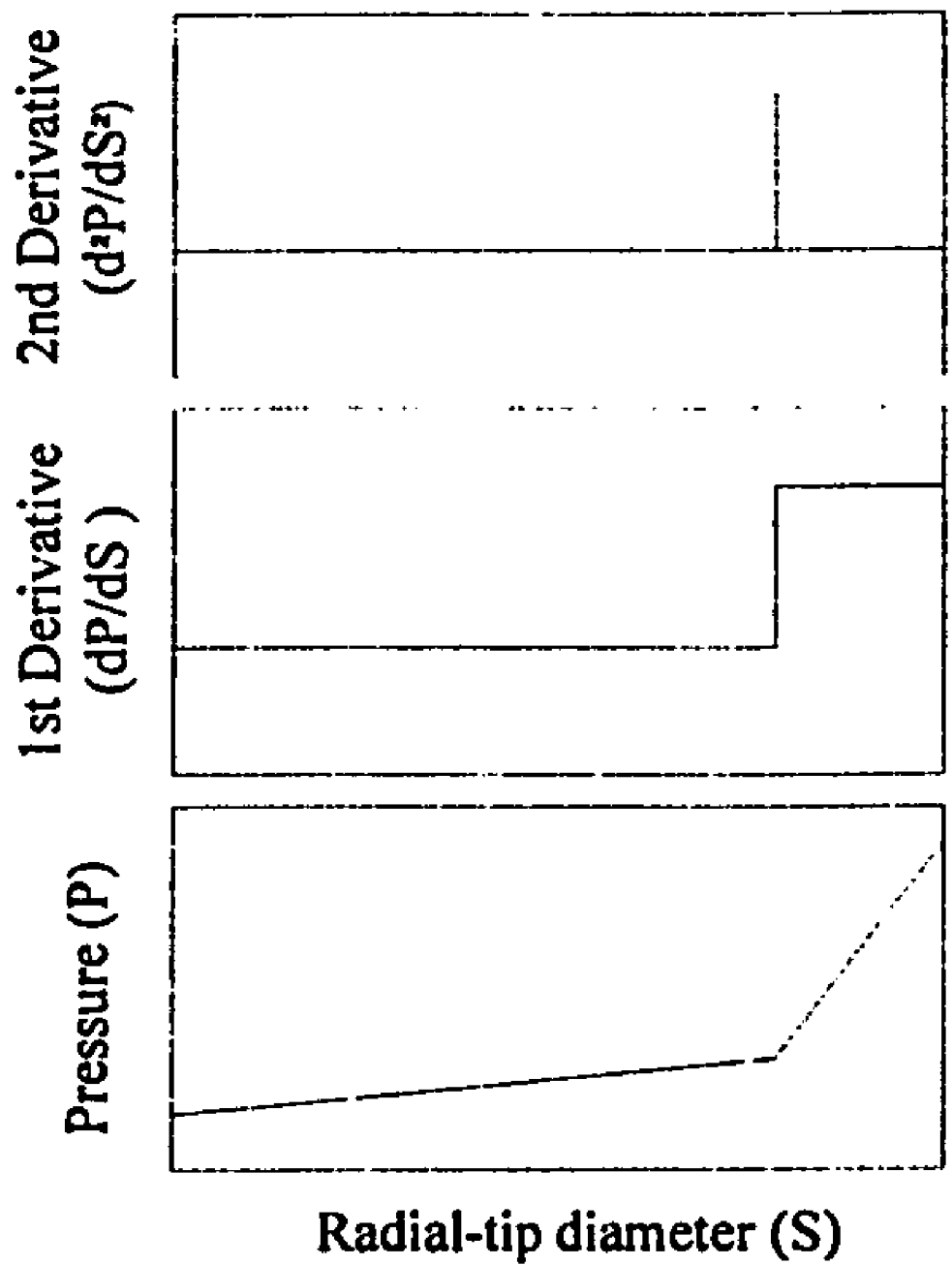

FIG. 4: is the graphical illustration of Nature of pressure vs. radial leg tip-diameter graph obtained during measurement.

Figure 5:
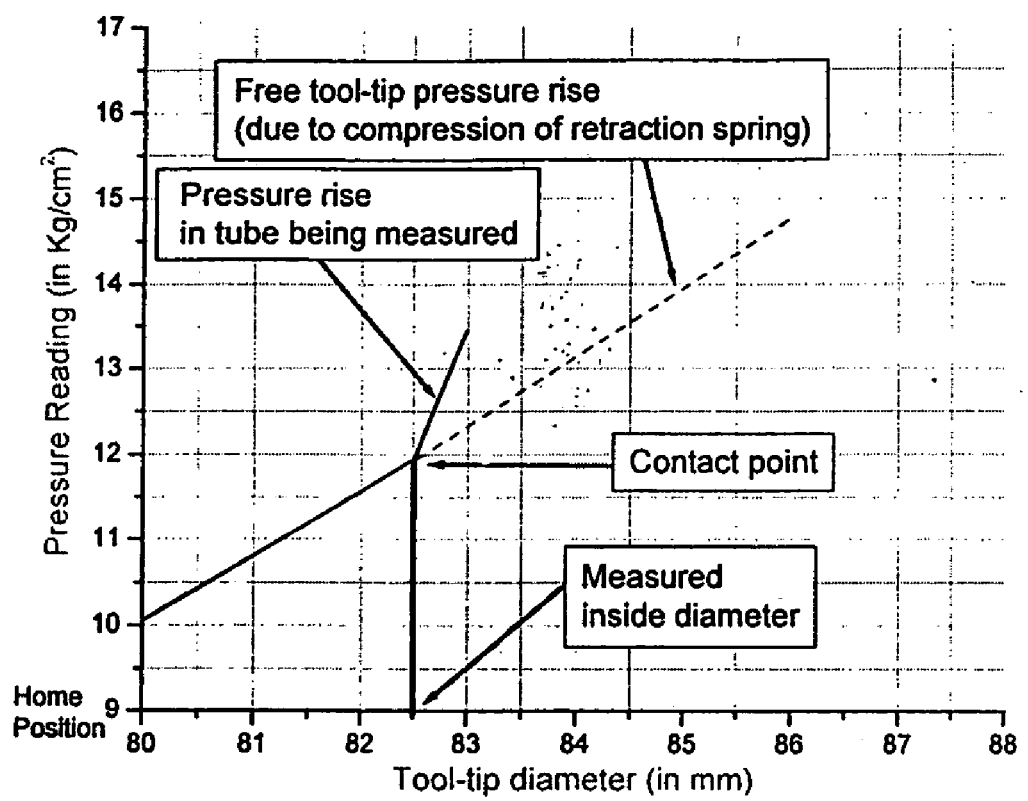

FIG. 5: is the graphical illustration of processing/analyzing steps of data on pressure versus radial-tip diameter through the data acquisition and control means of the control unit, demonstrating the sudden rise in system fluid pressure at selective point of contact of legs.

DETAILED DESCRIPTION WITH REFERENCE TO THE ACCOMPANYING FIGURES

The present invention is directed to a system/apparatus for measuring the inside diameter of long straight/curved pipes and tubes remotely by the operation of a hydraulic micrometer. More particularly, the present invention provides indirect measurement of inside diameter of pipes/tubes involving a hydraulically operated micrometer in which the three-point micrometer head having three radial legs pushed outward by the linear movement of an conical ramp under hydraulic pressure, wherein the micrometer head goes deep inside the long straight/curved pipes/tubes being measured, being connected to its control unit by means of a flexible hydraulic hose, with capacity to bear adequate pressure. More advantageously, the micrometer head of said hydraulically operated inside diameter measuring micrometer, is adapted to go deep inside a long straight/curved pipe/tube where direct straight-line access is not possible by conventional mechanical type micrometer head having rigid connection to its operating spindle either directly or through a number of extension rods. Said three-point contact is obtained by favored self-centering type radial legs attached to the hydraulic micrometer head which is remotely operated making the instrument simple, robust and reliable and capable of being used in difficult to reach or hazardous to access working situations.

The micrometer head of the hydraulically operated system of measuring according to the present invention is based on the positive fluid displacement control of the pistons of two cylinders, which are hydraulically coupled by a flexible hose, one of which cylinders is a "master cylinder" forming a part of the control unit and which actuates the other cylinder being a "slave cylinder", by the operation of a lead screw and nut arrangement providing lateral movement to the piston of the master cylinder at a controlled rate when the nut is rotated at desired RPM and torque by a stepper motor.

Thus the displacement of piston of the slave cylinder is indirectly controlled by actuating the piston of the master cylinder by transmitting pressure through the hydraulic hose which in turn controls the simultaneously outward movements of three circumferentially equispaced radial legs on the three-point self centering type micrometer head by the linear action of the conical ramp. In the present system of measuring internal diameter of pipes/tubes remotely, the slave cylinder is installed at the micrometer head whereas the master cylinder is installed at its control unit. The rate of rise of pressure of the system fluid is monitored to favour measure of the internal diameter based thereon and the feedback data from the encoder and pressure transmitter in the system, is analyzed on-line at data acquisition and control panel based on which a graph of pressure vs. radial leg tip-diameter is generated. The inside diameter of the pipe/tube is determined remotely by processing these data, determining the contact point where rate of rise of pressure is suddenly accelerated. The hydraulic micrometer of the invention has a measuring accuracy of the order of such as 0.1 mm for the diameter measurement range of 80 mm to 86 mm. However, the micrometer system can be configured for different diameter ranges as per the requirements of different applications.

Thus the hydraulic micrometer of the present invention is capable of advantageous remote measurement of inside diameter of pipes and tubes in application in the fields comprising manufacturing industries, process industries, power plants, chemical plants etc., including hazardous and unapproachable positions/locations by human being. The instrument is adapted to be used for shop-floor applications involving production of pipes and tubes, for under-water applications, for in service/process inspection and certification and for other similar applications. This instrument is further optionally provided with in-built calibration facility and has optional automated operational features like PC-based control, display and data analysis.

Reference is first invited to accompanying FIG. 1 that illustrates the schematic diagrams highlighting comparative functional attributes and working principles of the self-centering hydraulic micrometer head according to the present invention and conventional mechanical micrometers The hydraulic three-point micrometer, though similar to mechanical three-point micrometer to some extent, has a number of distinct features as detailed below.

As already described and is apparent from the accompanying FIG. 1, that in a mechanical three-point micrometer, its head has three radial legs that are pushed outward by the rotary action of a spiral ramp. The spiral ramp is rigidly coupled to its operating spindle either directly or through a number of extension rods. The spindle carries a feel ratchet which slips when the radial legs are in contact with the inside diameter at a constant torque, and thereby providing a direct measurement of inside diameter at any location in pipe/tube with reasonable accuracy under static rigid contact condition of legs. However, such mechanical micrometer do not provide for access for remote measurement of inside diameter of long straight/curved pipes and tubes with desired accuracy and reliability while maintaining required operators safety even when the same is applied in toxic or hazardous working environment.

The hydraulic three-point micrometer of the present invention on the other hand, having three-point self-centering micrometer head also has three circumferentially equispaced radial legs for measuring the inside diameter of pipes/tubes with precise accuracy and reliability. However, for carrying out the measurement with this apparatus, these legs are pushed outward by the linear action of a conical ramp. The conical ramp contained in the 'slave cylinder' of the hydraulic system, is connected to a control unit of the 'master cylinder' through flexible hose and not through rigid extension rods. Thus the contact pressure is a dynamic parameter to be continuously monitored and feedback that is analyzed to maintain uniform steady contact pressure on each of the tips of the three legs. The rate of rise of pressure of the system fluid is monitored to favour measure of the internal diameter based thereon.

Reference is next invited to accompanying FIG. 2, that illustrates the micrometer head and the control unit according to the hydraulically operated micrometer of the present invention. Accompanying, FIG. 2 clearly showing the two main components of the hydraulic micrometer according to the invention e.g. (a) the three point self centering micrometer head that contains the slave cylinder (1), and (b) the Control unit containing the master cylinder (2), both being operated hydraulically and are connected with a flexible hose.

Reference is now invited to the accompanying FIG. 3, that illustrates the entire system of the hydraulic micrometer comprising the three-point self-centering head having three radial legs and the control unit and the connecting flexible hose between the two main components. The accompanying FIG. 3 representing an embodiment of the present invention, provides sectional views of different elemental units of the system for better explanation of the manner of implementation of the inside diameter measurement procedure for pipes/tubes with the help of hydraulically operated micrometer system according to the present invention.

The hydraulic system for the inside diameter measuring micrometer according to the invention, as illustrated in accompanying FIG. 3, consisting of a control unit (1) and a micrometer head (3) connected by a flexible hydraulic hose (2). The present hydraulically operated system is capable of measuring the inside diameter of a pipe/tube (4) that may be straight or curved, with the head adapted to be inserted deep in to the pipe/tube.

It is apparent from the FIG. 3, that the various components of the Control unit (1) consisting of the essential parts in said unit being Master cylinder (1/1) and Piston (1/2), Lead screw (1/3) and its Nut (1/4), Pressure transmitter (1/5), Stepper Motor (1/6) fitted with Encoder (1/7) and Data acquisition and control panel (1/8), the relative position of which in the assembly is illustrated to clearly demonstrate the functional contribution of each to the system.

The hydraulic hose (2) connects the control unit (1) and micrometer head (3), providing a flexible hydraulic connection operatively between the master and the slave cylinders, for transmitting adequate pressure from the former cylinder to the later to carry out desired inside diameter measurement function.

The Micrometer Head (3) comprising the components like slave Cylinder (3/1), piston (3/2) and its retraction spring (3/3), the radial legs (3/4) and the Bearings (3/5), is adapted to carry out the measurement of inside diameter of long straight/curved pipe/tube, by its three self centering radial legs operated under the action of selective hydraulic pressure to maintain desired steady contact pressure at the tips of leg in contact with inner wall of pipe/tube.

The functioning of the hydraulically operated micrometer of the present invention is based on hydraulic pressure transmission from the master to the slave cylinder so that the control unit is able to precisely monitor the movement of the radial legs remotely when the micrometer head is inserted deep inside a pipe or tube at a location inaccessible by conventional means, to measure the inside diameter as displayed on the control panel.

The control unit (1) provide required motion to the Master piston (1/2) of the Master cylinder (1/1) to develop required pressure of working fluid by the action of a stepper motor (1/6) which rotates the lead screw nut (1/4), and thus causes the forward motion of the lead screw (1/3) along with the master piston (1/2). Any displacement of master piston (1/2) creates an equivalent displacement of the slave piston (3/2) associated with a positive fluid displacement, the displacement developed being based on the principle of A1.X1=A2.X2, where A1 & A2 are the cross section areas and X1 & X2 are the piston displacements in the master and the stave pistons respectively. The piston rod of the slave piston (3/2) is of conical shape known to be a cone ramp. Hence, linear displacement of the conical shaped slave piston (3/2), in turn, extends/push outward the three radial legs (3/4) and thereby increases the tip-diameter of the radial legs. This continues until the tips of the radial legs (3/4) make contact with inside surface of the tube/pipe (4) being measured and build up a steady desired contact pressure, corresponding to controlled pressure of the system fluid.

The encoder (1/7) attached to the stepper motor and pressure transmitter (1/5) operatively sensing the rotation/speed of stepper motor and the working pressure data inside the Master cylinder/fluid system, provide necessary feedback used to analyze on-line operating data at the data acquisition and control panel (1/8), in said control unit enabling carrying out of the measurement of diameter by graphical interpretation.

The accompanying FIG. 4 provides the graphical presentation of these data, wherein a graph of pressure vs. radial leg tip-diameter, is generated. Inside diameter of the pipe/tube (4) is determined by the processing of these data, to find out the contact points where pressure rise rate is suddenly accelerated, as graphically represented in the accompanying FIG. 5. The graphical plot of observed and processed data in the accompanying FIG. 4 indicates that for a home position of the three legs of three-point micrometer head at 80 mm, the observed diameter is 82.5 mm corresponding to a particular location inside the pipe/tube, where contact-point diameter is determined based on sudden sharp rise in system fluid pressure, ensuring uniform contact pressure at the tips of legs, processed through the data acquisition and analysis panel of the control unit.

A retraction spring (3/3) inside the slave cylinder (3/1) operatively helps to bring back the slave piston(3/2) to home position after completion of each measurement. The bearings (3/5) facilitates centering of the micrometer head (3) inside the tube/pipe (4) during measurement.

The industrial applicability and potential for wide application in similar other fields can be understood from the following non limiting example:

EXAMPLE

The hydraulically operated micrometer of the present invention, in a typical application is utilized for remote measurement of inside diameter of water filled coolant channel of pressurized heavy water reactors in radioactive environment of a power plant. The micrometer head (3) is inserted in the coolant channel through a special seal plug and it is operated with the control unit(1) placed inside a control room located at long distance away from the radioactive area. The hydraulic micrometer having features as described above was qualified for this application. Inside diameter readings of the hydraulic micrometer and the conventional instrument were compared. Measurement accuracy of the hydraulic micrometer was found to be 0.1 mm in the dimension range of 80 mm to 86 mm.

It is thus possible by way of this invention to provide a micrometer system of measuring inside diameter of long straight/curved pipes/tubes involving a hydraulic micrometer head adapted for positioning inside the object to be measured and its control unit remotely disposed and operatively connected through a long flexible hydraulic hose. Thus, inside diameter measurement is possible deep inside a long straight/curved pipe/tube by inserting the micrometer head and simple extension of flexible connecting hose from the control unit located at a distant convenient location for access and interpretation of the operator. The system of measuring the inside diameter is further adapted to be operated from its control unit, located at a suitable location, ensuring safety of the operator even in hazardous working environment, making the measurement possible in presence of toxic materials and in radioactive areas. Moreover such inside diameter measurement is possible with this system in high temperature area or in under-water application. Advantageously, the hydraulic micrometer head deployed for remote measurement of data does not contain any electronic devices and as such ensures that its operation is not affected by signal drift, electrical noise and other such disturbances while working even in presence of elevated temperature or pressure, radiation, vibration etc. at the location of measurement. This attribute ensure long life and reliable operation of the instrument. Moreover, the three-point hydraulic micrometer head being self-centering type with three radial extendable legs, makes engineering characteristics of this remotely operated instrument simple, robust and reliable. Such system is further adapted for operation in robotic appliances involving remote dimensional inspection. The hydraulically operated at least one contact point micrometer of the present invention is thus having wide and versatile industrial application, providing accuracy and reliability in measured data on sustainable basis.

We claim:

1. A hydraulic micrometer system adapted for remote measurement of inside diameter of long straight/curved pipes and tubes, comprising:
   a hydraulically operable master cylinder having a cooperative master piston installed in a control unit;
   a slave cylinder having three radially displaceable radial legs for diameter measurement with a cooperative slave piston installed in the micrometer head adapted to traverse inside for said dimension measurement and flexibly hydraulically coupled to said master cylinder such that displacement of the piston of the slave cylinder is indirectly controlled by the actuation of the piston of the master cylinder in said control unit, said slave piston rod being conical shaped such that said displacement of the slave piston in relation to said main piston causes said three radial legs to extend outwards and finally touch the internal contact point for internal dimension measurement; and
   means for continuous measurement of the rate of rise of pressure of system fluid and measure the internal dimension at contact point detected by sudden rise in pressure rise rate of system fluid on touching of said radial leg at said internal contact point.

2. A hydraulic micrometer system as claimed in claim 1, wherein said three radially displaceable radial legs of said slave cylinder placed circumferentially equispaced position are adapted for measurement of dimensions of internal diameter.

3. A hydraulic micrometer system as claimed in claim 1, wherein said slave cylinder is flexibly hydraulically connected to said main cylinder through a long flexible hose such that the micrometer head having the slave cylinder and radial legs for internal dimension measurement can be inserted deep into the object whose internal dimensions are measured.

4. A hydraulic micrometer system as claimed in claim 1, wherein said micrometer head is self-centering type.

5. A hydraulic micrometer system as claimed in claim 1, further comprising:
   in-built calibration means; and
   automated operational features including PC based control unit, display and data analysis.

6. A hydraulic micrometer system as claimed in claim 1, wherein said control unit comprises:
   said master cylinder with master piston operatively connected to lead screw and its nut whereby the rotation of the stepper motor which is operatively connected to the lead screw nut is adapted to rotate the lead screw nut causing forward motion of the lead screw with the master piston;
   a pressure transmitter;
   said stepper motor fitted with an encoder means; and
   a data acquisition and control panel.

7. A hydraulic micrometer system as claimed in claim 1, wherein said micrometer head comprises:
   said slave cylinder having a cooperative slave piston with a retraction spring;
   said radial legs; and
   bearings of said micrometer head.

8. A hydraulic micrometer system as claimed in claim 1, wherein in said control unit the feedback data from said encoder and said pressure transmitter are analyzed on-line at data acquisition and control panel which is utilized to generate a graphical representation of pressure vs. radial leg tip-diameter, the dimension at contact point being identified by sudden rise in pressure rise rate on touching of the radial leg at said internal contact point.

9. A method of remote measurement of internal dimensions of long straight/curved pipes and tubes, depth of slot or groove, robotic applications involving remote dimensional inspections and the like, comprising:
   providing the hydraulic micrometer system as claimed in claim 1;
   inserting the micrometer head having the slave cylinder deep inside the pipeline/groove etc whose internal dimensions are to be measured;
   operating the stepper motor which rotates the lead screw nut causing forward motion of the lead screw with the master piston in the control unit whereby the displacement of the master piston causes equal displacement of the slave piston which in turn extend the radial legs and the tip diameter of the radial legs increases until it comes in contact with the inside surface of the tube/pipe; and
   analyzing online the feed back data from the encoder and pressure transmitter at data acquisition and control panel and generating the graph of pressure vs. radial leg tip-diameter and identifying based on the sudden rise in the pressure rise rate at contact point to determine the internal dimension.

* * * * *